United States Patent
Oh et al.

(10) Patent No.: US 12,155,068 B2
(45) Date of Patent: Nov. 26, 2024

(54) ANODE MATERIAL—METHOD OF PRODUCTION AND SOLID-STATE BATTERY MADE THEREWITH

(71) Applicant: The Regents of the University of Colorado, Denver, CO (US)

(72) Inventors: Hyukkeun Oh, Boulder, CO (US); Se-Hee Lee, Superior, CO (US); Joshua Buettner-Garrett, Arvada, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 543 days.

(21) Appl. No.: 16/756,686

(22) PCT Filed: Oct. 16, 2018

(86) PCT No.: PCT/US2018/056026
§ 371 (c)(1),
(2) Date: Apr. 16, 2020

(87) PCT Pub. No.: WO2019/079258
PCT Pub. Date: Apr. 25, 2019

(65) Prior Publication Data
US 2021/0202936 A1    Jul. 1, 2021

Related U.S. Application Data

(60) Provisional application No. 62/572,691, filed on Oct. 16, 2017.

(51) Int. Cl.
*H01M 4/38* (2006.01)
*H01M 4/134* (2010.01)
(Continued)

(52) U.S. Cl.
CPC ........... *H01M 4/387* (2013.01); *H01M 4/134* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS 5,677,081 A * 10/1997 Iwamoto ........... H01M 10/0562
429/225
2003/0054249 A1    3/2003 Yamamoto et al.
(Continued)

FOREIGN PATENT DOCUMENTS

JP    2003-115294    *  4/2003
JP    2014-192093    *  10/2014
(Continued)

OTHER PUBLICATIONS

PCT/US2018/056026 International Search Report and Written Opinion mailed Dec. 27, 2018, 6 pp.
(Continued)

*Primary Examiner* — Laura Weiner
(74) *Attorney, Agent, or Firm* — Polsinelli PC; Gregory P. Durbin

(57) ABSTRACT

A solid-state battery includes an anode material including silicon or tin. The anode material may include silicon and/or tin in various forms including layers or intermixed particles of various phases and crystallinity.

14 Claims, 8 Drawing Sheets

(51) Int. Cl.
*H01M 4/36* (2006.01)
*H01M 4/48* (2010.01)
*H01M 10/0562* (2010.01)
*H01M 10/0565* (2010.01)
*H01M 4/02* (2006.01)

(52) U.S. Cl.
CPC .............. *H01M 4/386* (2013.01); *H01M 4/48* (2013.01); *H01M 10/0562* (2013.01); *H01M 10/0565* (2013.01); *H01M 2004/027* (2013.01); *H01M 4/38* (2013.01)

(56) References Cited

U.S. PATENT DOCUMENTS

2011/0065006 A1* 3/2011 Ogasa .................. H01M 4/366
429/224
2017/0222254 A1 8/2017 Sakamoto et al.

FOREIGN PATENT DOCUMENTS

JP 2015-005353 * 1/2015
WO WO 2009/101506 * 8/2009
WO WO 2013/125485 * 8/2013

OTHER PUBLICATIONS

Olson (2012) "2012 Minerals Yearbook: Graphite." U.S. Geological Survey, 11 pp. [Retrieved from the internet: https://minerals.usgs.gov/minerals/pubs/commodity/graphite/myb1-2012-graph.pdf].
PCT Application No. PCT/US2018/056026, International Preliminary Report on Patentability, dated Apr. 21, 2020, 5 pages.
Whiteley et al., High-Capacity and Highly Reversible Silicon-Tin Hybrid Anode for Solid-State-Lithium-Ion Batteries, Journal of the Electrochemical Society, 163(2): A251-A254, 2016.
Yang et al., Anodes for lithium batteries: tin revisited, Electrochemistry Communications, 5, 587-590, 2003.

* cited by examiner

ANODE MATERIAL—METHOD OF PRODUCTION AND SOLID-STATE BATTERY MADE THEREWITH

RELATED APPLICATIONS

This application claims benefit of priority to U.S. Patent Application No. 62/572,691, filed on Oct. 16, 2017, which is incorporated herein by reference.

GOVERNMENT RIGHTS

This invention was made with government support under Missile Defense Agency Contract HQ0147-15-C-7238. The government has certain rights in the invention.

FIELD

Various embodiments described herein relate to the field of solid-state primary and secondary electrochemical cells, electrodes and electrode materials and corresponding methods of making and using same.

SUMMARY

In an embodiment, a solid-state battery utilizes an anode material including silicon and/or tin. The anode material may include silicon (Si) or tin (Sn) in various forms including continuous layers or intermixed particles of various phases and crystallinity.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

Figure 1A:
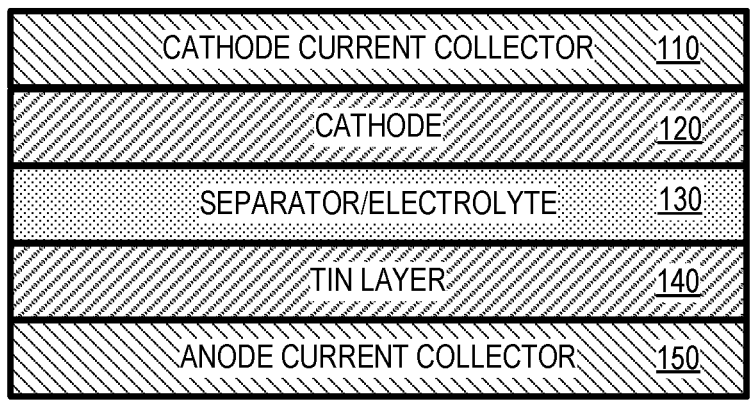
FIGS. 1A-3B are schematic sectional views of exemplary constructions of solid-state electrochemical cells including anode compositions as described herein, in accordance with an embodiment.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes, devices, and systems finding application in the various embodiments described herein are not disclosed in detail.

The ever-increasing number and diversity of mobile devices, the evolution of hybrid/electric automobiles, and the development of Internet-of-Things devices is driving greater need for battery technologies with improved reliability, capacity (Ah), thermal characteristics, lifetime and recharge performance. Currently, although lithium solid-state battery technologies provide increases in safety, packaging efficiency, and enable new high-energy chemistries, improvements are needed. Specifically, work is ongoing to improve the production and performance properties of anode and cathode compositions.

Silicon, silicon oxide ($SiO_x$) and tin are considered candidates for high specific capacity anode materials in next-generation solid-state batteries due to their high theoretical capacity and natural abundance. However, the very high volume expansion of each of these materials during lithiation causes severe capacity decay during cycling of electrochemical cells where used. This expansion therefore impedes wide-spread implementation of a silicon-based and/or tin-based anodes in commercialized electrochemical cells. Reactions between the anode materials and conventional liquid electrolytes also pose a significant problem as the solid-electrolyte interphase (SEI) layer is continuously broken down and reformed during expansion and contraction of the material(s).

Tin as a standalone anode material is typically used in particle form, often in a composite with binders, electrolytes, and expansion-accommodating conductive additives. Tin is capable of alloying with lithium. Higher energy density and improved processability may be obtainable if a monolithic sheet of tin could be used, but this architecture of electrochemical cell results in rapid capacity fade and resistance rise when used with a liquid electrolyte such as described in "Anodes for lithium batteries: tin revisited" by Yang, et al. in Electrochemistry Communications 5 (2003) 587-590.

Tin particles may also be used in a composite layer with silicon particles, where the tin serves as an active material and also as a mixed ionic and electronic conductive matrix to enhance anode performance in all-solid-state Li-ion batteries. Tin is a ductile metal and has high electronic and ionic conductivities which enables it to form a conductive and conformal interface with other components of the anode composite. Whiteley, et al. (in "High-Capacity and Highly Reversible Silicon-Tin Hybrid Anode for Solid-State Lithium-Ion Batteries" in Journal of The Electrochemical Society, 163 (2) A251-A254 (2016)) demonstrated a silicon-tin hybrid anode prepared by hand-mixing a composite of silicon and tin sub-micron powders and an inorganic solid-state electrolyte (SSE). During lithiation of the anode composite, tin was expected to be lithiated first and expand, generating additional internal pressure in the anode. This pressure enabled better encapsulation of silicon particles by the ductile tin material, which resulted in improved cycling reversibility.

Although there is evidence of the use of silicon and/or tin with lithium-based electrochemical cells as noted above, the existing processes and techniques face multiple challenges and limitations for realization of theoretical performance parameters and applicability for commercialization. For example incorporating SSE into the composite of tin and silicon in a controlled fashion adds complexity to the anode composite from a manufacturing standpoint. Dry or wet mixing would be required to create the mix, and then this composite must be cast or formed into a uniform layer. In addition, possible side reactions between the electrolyte and active silicon and tin components would be enhanced when SSE is added throughout the composite. While alternative methods to mixing may be used, creating an ideal matrix of silicon in tin and combining with an SSE by physical deposition, chemical, or electrochemical means adds cost and complexity while also adding passive mass and volume to the cell.

The present invention below describes multiple embodiments with improved use of silicon and/or tin forming at least part of an anode layer. Three specific embodiments may be summarized as follows: 1) a layer of tin metal proximate a solid electrolyte layer and an anode current collector: 2) a silicon or silicon-based layer proximate a layer of tin metal; and 3) a silicon or silicon-based layer proximate and between multiple layers of tin metal.

It is expected that in the above embodiments anode and overall electrochemical cell performance is improved by a number of mechanisms. First, in bi- and tri-layer embodiments, ion and electron conduction paths are maintained during charge/discharge cycling as the silicon layer may maintain contact with the softer tin even if the silicon pulverizes as it expands and contracts. Stack pressure on the electrochemical cell may further assist to ensure that this contact is maintained. Second, and unlike in liquid electrolyte cells, the solid electrolyte only comes into contact with the tin in a single plane in particular embodiments, rather than penetrating into the bulk of the layer. This limits the magnitude of side reactions between the two components. When a liquid electrolyte is used, the decomposition film known as the solid-electrolyte interface is continuously reformed throughout the anode layer as the tin or silicon active material expands and contracts. In the present invention, much higher coulombic efficiencies and more stable resistance are attained due the reduction of continuous SEI formation.

FIGS. 1A-3B are schematic sectional views of exemplary constructions of solid-state electrochemical cells including anode compositions of the present invention. In FIG. 1A specifically, lithium solid-state battery 100 includes cathode current collector 110, cathode 120, solid electrolyte/separator layer 130, tin layer 140, and anode current collector 150. Solid electrolyte layer 130 may be formed between cathode 120 and tin layer 140. Cathode current collector 110 electrically contacts cathode 120, and anode current collector 150 electrically contacts tin layer 140.

Tin layer 140 may be incorporated in lithium solid-state battery 100 as a free-standing foil or it may be a layer deposited by electroplating, hot-dipping, vapor deposition, sputtering, melt extrusion, etc. When two or more tin layers are present (c.f., FIG. 1C-3A), they may be made using the same process or different processes. Any tin layer may also consist of tin particles with or without a binder deposited, for example, by a wet coating process.

Cathode current collector 110 may be formed from materials including, but not limited to, aluminum, nickel, titanium, stainless steel, or carbon. Cathode 120 may be any cathode material including but not limited to lithium nickel manganese cobalt oxide (NMC), lithium nickel cobalt aluminum oxide (NCA), lithium nickel manganese oxide (LNMO), or lithium cobalt oxide (LCO) compatible with other components of battery 100. Similarly, anode current collector 150 may be formed from stainless steel, nickel, or nickel-plated copper. The anode current collector can be any thin (<30 microns) electronically conductive material that has a stable interface in contact with tin.

Figure 1B:
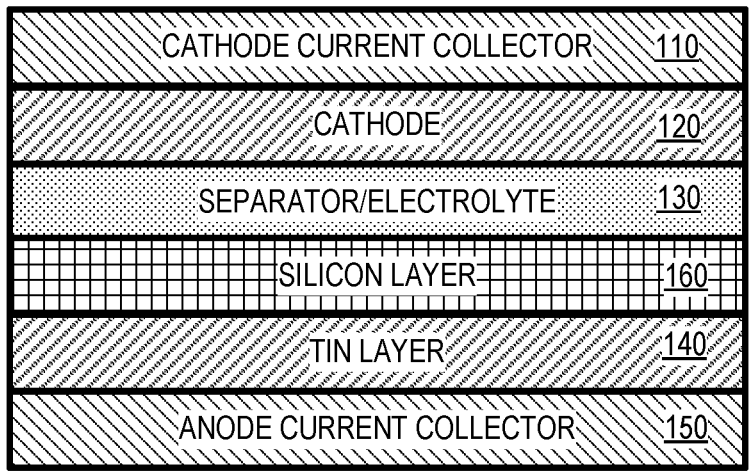
Figure 1C:
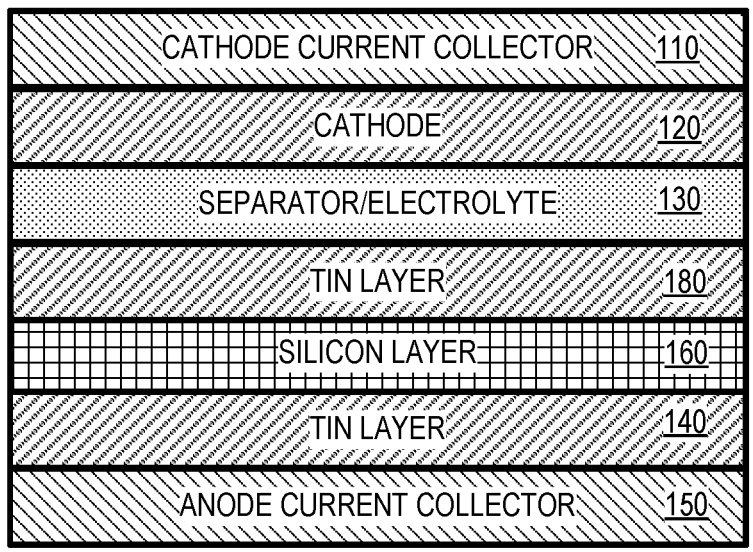

In FIG. 1B, silicon layer 160 may be additionally added to battery 100 to form the structure of battery 170. Silicon layer 160 may be added between solid electrolyte layer 130 and tin layer 140. In alternative construction, layers 160 and 140 may be exchanged. In FIG. 1C, an additional tin layer 180 may be additionally added to battery 170 to form the structure of battery 190. Tin layer 180 may be added between solid electrolyte layer 130 and silicon layer 160. Silicon layer 160 may be deposited as a continuous sheet or it may consist of a layer of particles with or without a binder.

Figure 2A:
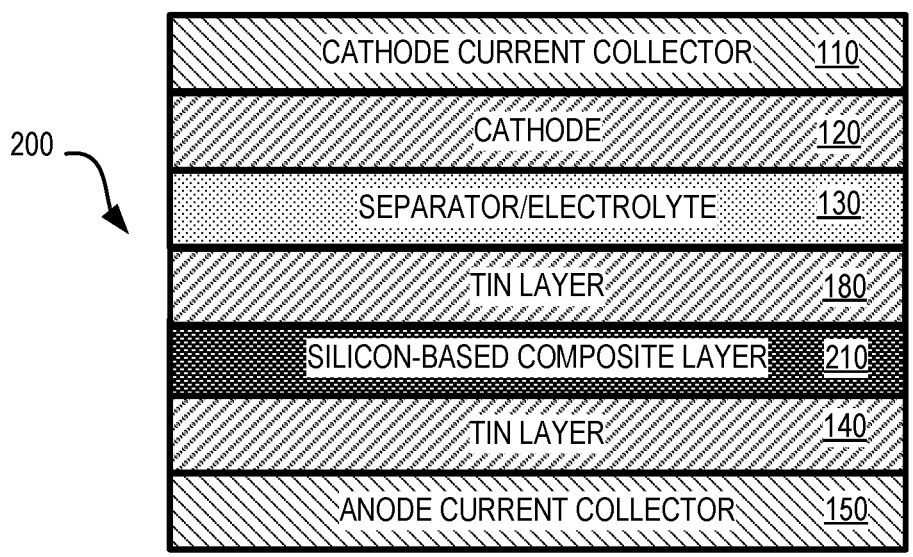
Figure 2B:
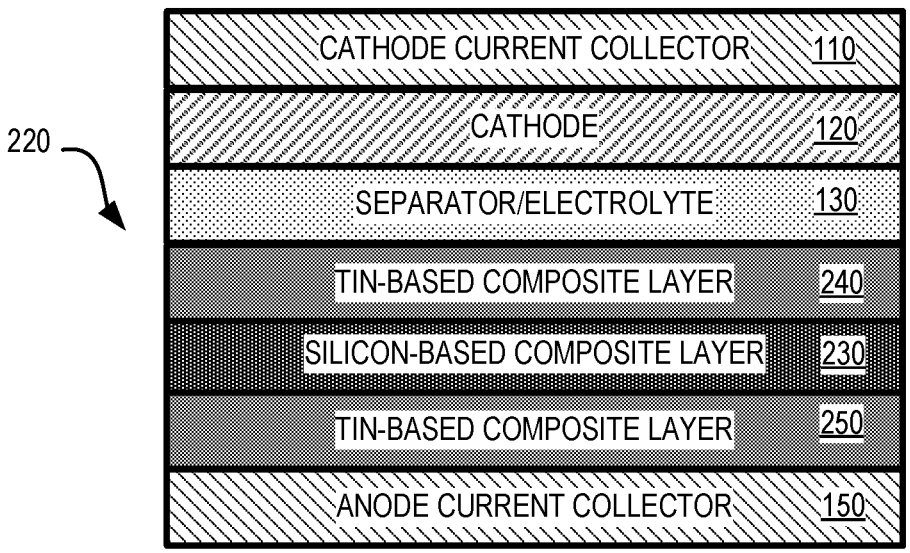

In FIG. 2A, silicon layer 160 of FIG. 1C may be replaced with silicon-based composite layer 210 to form the structure of battery 200. Layer 210 may include silicon particles with particle size ranging 10 nm to 5 µm. Layer 210 may further include a binder. Binder candidates include but are not limited to polytetrafluoroethylenes (Teflon®), polyvinylidene fluorides (PVF2 or PVDF), ethylene-propylene-diene (EPDM) rubbers, polystyrene, polyacrylonitrile (PAN), styrene-butadiene rubber (SBR), cellulose, polyethylene oxides (PEO), acrylates, and divinyl ethers. Layer 210 may further include conductive additives such as carbon black, carbon fibers, or carbon nanotubes. Layer 210 may further include a solid electrolyte. Possible solid electrolytes include but are not limited to inorganic sulfide, oxide, or phosphate electrolytes, solid polymer electrolytes, and gel polymer electrolytes. The solid electrolyte content should be kept to a minimum in order to avoid side reactions with the active material, preferably less than 30 volume percent of the layer 210. More preferably the electrolyte should be less than 20 volume percent, even more preferably less than 10 volume percent, and still more preferably less than 5 volume percent. Most preferable is a layer 210 containing no electrolyte within the layer. Layer 210 may further include a second anode active material such as graphite or hard carbon. Replacing Layer 160 with the composite Layer 210 provides a reduction in processing cost and improve scalability by removing the costly sputtering step. In FIG. 2B, tin layers 140 and 180 of FIG. 2A may be replaced with tin-based composite layers 240 and 250 respectively to form the structure of battery 220. Layers 240 and 250 may include tin particles with particle size ranging 10 nm to 5 µm. Layers 240 and 250 may further include the same binders, conductive additives, and solid electrolytes used in the composite silicon layers.

Figure 3A:
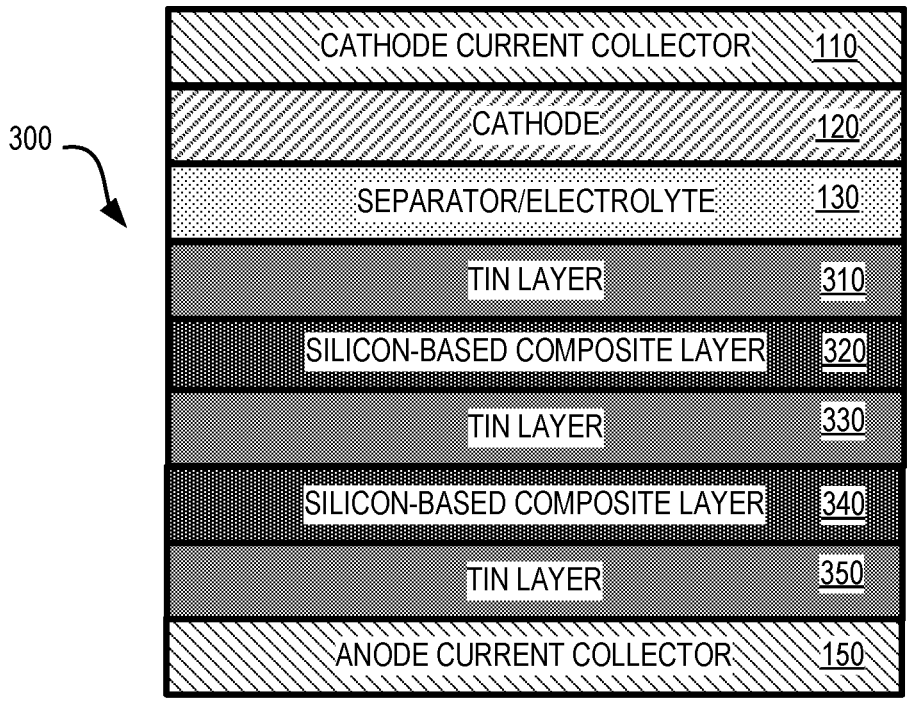
Figure 3B:
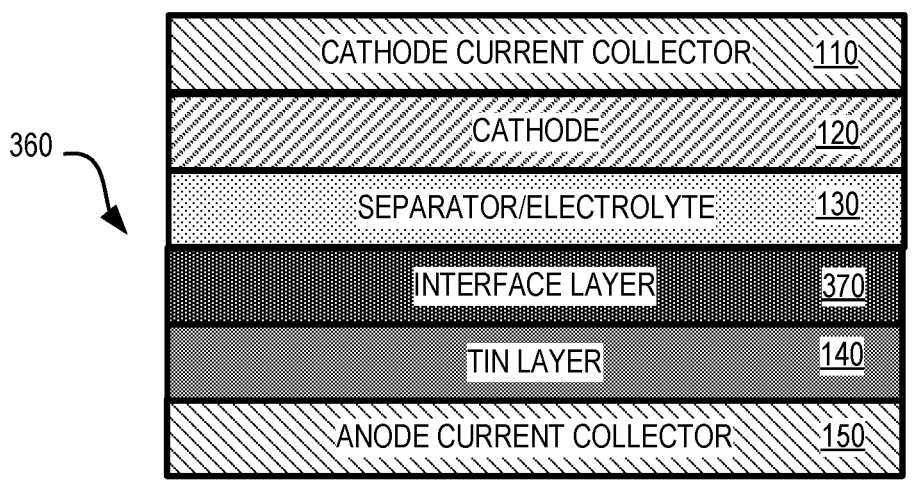

In FIG. 3A, tin layer 140 of FIG. 1A may be replaced with multilayer combination of tin layers 310, 330 and 350 with interposed silicon-based composite layers 320 and 340 to form the structure of battery 300. Introducing several Sn—Si repeating units allows the total capacity per area to be increased without requiring thick Si layers. This improves cell cycle life by ensuring that pulverized Si maintains contact with the conductive Sn. In FIG. 3B, interface layer 370 may be interposed between solid electrolyte/separator layer 130 and tin layer 140 of FIG. 1A. Interface layer 370 may be applied between layers 130 and 140, for example, in the case that the two materials are not thermodynamically stable. Interface layer 370 may be formed from a polymer, oxide, sulfide, or fluoride material.

Although indicated in FIGS. 1A-3B as lamellar structures, it is well known that other shapes and configurations of solid-state electrochemical cells are possible. Most generally, a lithium solid-state battery may be produced by providing a cathode, a solid electrolyte layer, and a silicon and/or tin layer sequentially layered and pressed between electrodes and provided within a housing. Although specific stackings of tin and/or silicon layers are shown in the associated figures, additional configurations may include alternate arrangements of the tin and silicon layers and/or include more layers of tin and/or silicon than shown and described.

The mechanical properties of tin, along with its ability to conduct both electrons and Li+ ions are the likely reason for the excellent performance. As such, other soft metals and metalloids capable of alloying with lithium, such as indium, antimony, lead, and gallium, can also be used in place of tin, or in addition to tin, in particular alternate embodiments. These materials tend to have hardness ≤3 on the Mohs hardness scale and bulk moduli <60 GPa. Even more typically, these materials tend to have hardness ≤2 on the Mohs hardness scale. Furthermore, the anode constructions described can be used with lithium-based or sodium-based cells as tin can also function as an anode material for sodium ion batteries.

Figure 4:
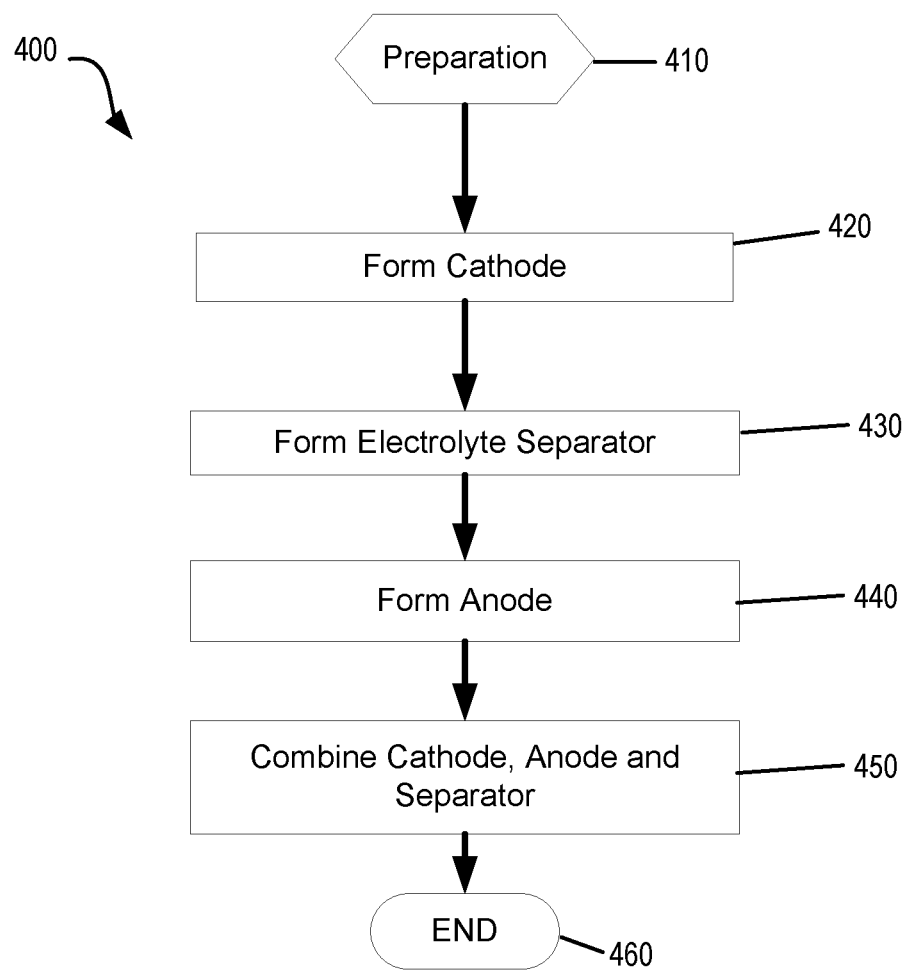
FIG. 4 is a flow chart of a process for producing a solid-state electrochemical cell as described herein, in accordance with an embodiment.

FIG. 4 is a flow chart of a process for producing a solid-state electrochemical cell based upon the structures described above in reference to FIGS. 1A-3B. Process 400 begins with preparation step 410 wherein any preparation action such as precursor synthesis, purification, and equipment preparation may take place. After any initial preparation, process 400 advances to step 420 wherein a cathode is formed by casting a slurry of cathode composite onto a current collector. Alternatively, a cathode composite powder can be created in a dry mixing process and saved for laminating by mechanical means to a battery cell stack in a later step. In Step 430 a solid state electrolyte separator is formed either by casting a slurry of SSE or by mechanically pressing SSE into a free standing pellet. In Step 440 the anode of tin or tin/silicon is formed. In Step 450, the cathode and anode formed in steps 420 and 440, respectively, are laminated or otherwise added to the SSE separator layer from step 430.

In final step 460, a completed electrochemical cell such as any cells of FIGS. 1A-3B may be evaluated for energy density and cycling performance.

Figure 5:
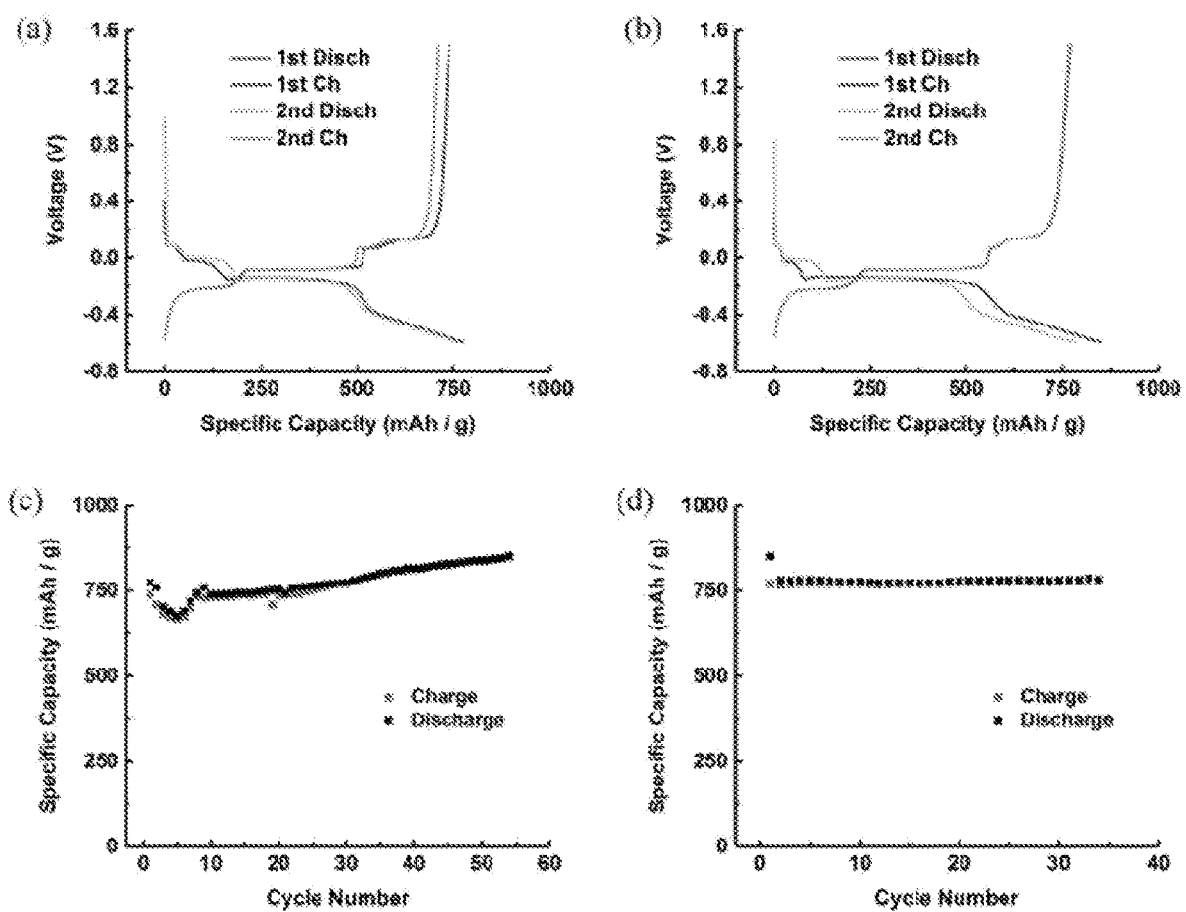
FIG. 5 is a set of plots indicating voltage and cycling characteristics of a solid-state electrochemical cell using an anode composition including a single layer of tin, in accordance with FIG. 1A and an embodiment.

FIG. 5 is a set of plots indicating voltage and cycling characteristics of a solid-state electrochemical cell as defined by the structure of FIG. 1A and including a single layer of tin. For the actual experimental cells, tin was sputtered as a single layer for two different durations of 2 hours (subplots "a" and "c") and 4 hours (subplots "b" and "d") with resulting thicknesses of 1.25 µm and 2.50 µm, respectively. The voltage profiles show clear plateau regions corresponding to the four lithiation phases of the tin, and these cells and anode constructions operate with very good cycling stability, showing specific charge and discharge capacities of approximately 750 mAh/g.

Figure 6:
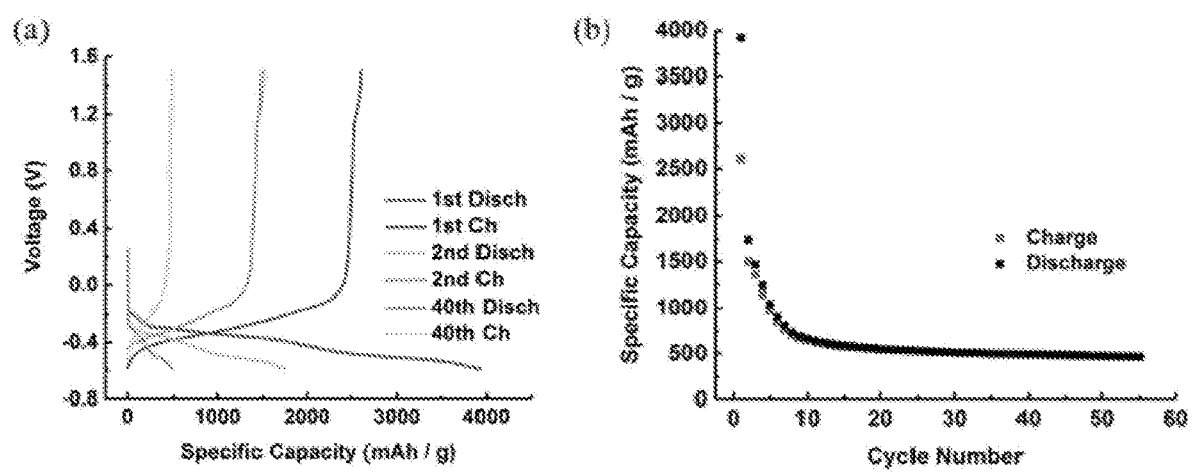
FIG. 6 is a set of plots indicating voltage and cycling characteristics of a solid-state electrochemical cell using an anode composition including a single layer of silicon.

In contrast to the good performance of the cell including the tin anode layer, FIG. 6 is a set of plots indicating voltage and cycling characteristics of a solid-state electrochemical cell using an anode composition including a single layer of silicon. The degradation of the capacity with repeated cycling is clearly indicated. For this test, the silicon was deposited by sputtering for 2 hours with a resulting layer thickness of 0.765 µm.

Figure 7:
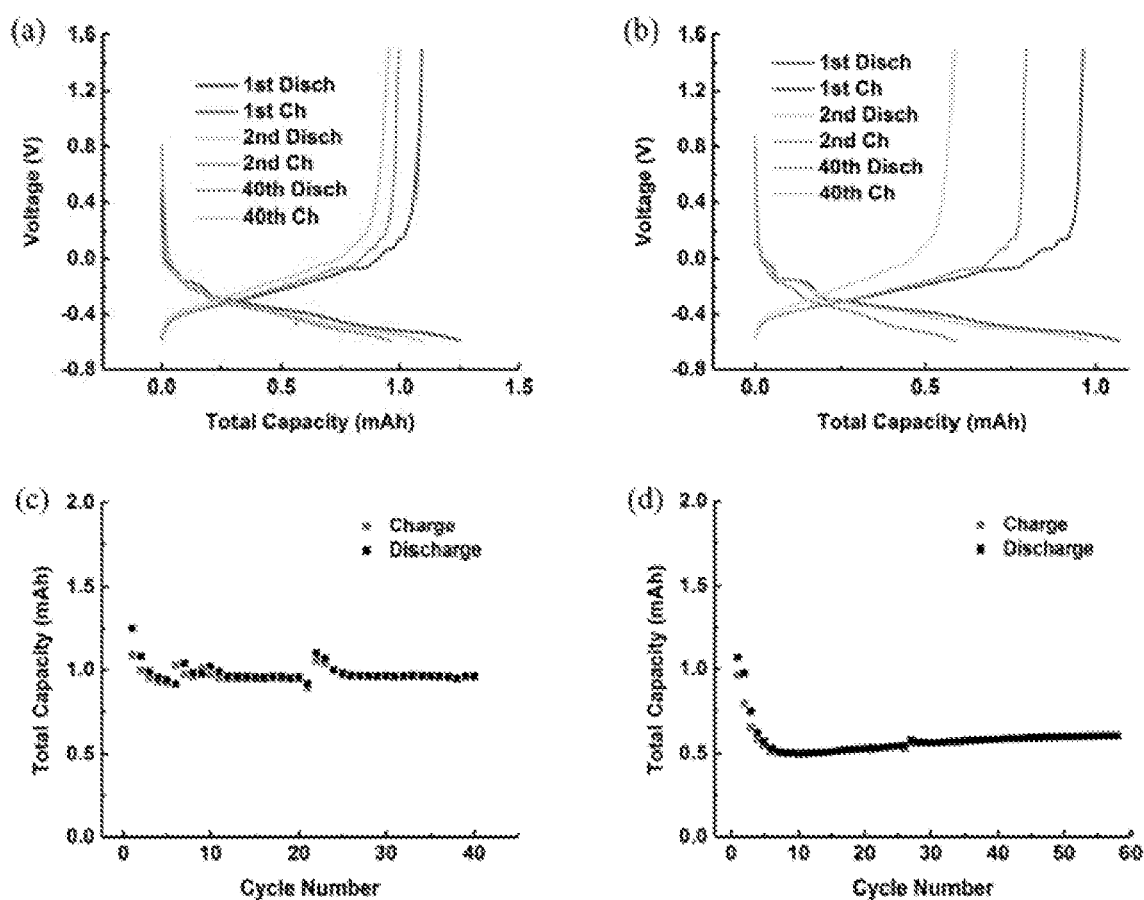
FIG. 7 is a set of plots indicating voltage and cycling characteristics of a solid-state electrochemical cell using an anode composition including single layers of tin and silicon, in accordance with FIG. 1B and an embodiment.

Higher specific capacity compared to the configuration of FIG. 1A may be achieved when tin and silicon are layered together. A tin layer between the current collector and a silicon layer, as shown in FIG. 1B, enables much improved cycling over silicon alone, presumably by maintaining electrical contact between the silicon layer and current collector. FIG. 7 is a set of plots indicating voltage and cycling characteristics of a solid-state electrochemical cell defined by the structure of FIG. 1B and including single layers of tin and silicon. For the actual experimental cells, the sputter order of the tin and silicon is exchanged and either tin or silicon is first deposited onto the current collector (subplots "a" and "c" have tin on the collector) and (subplots "b" and "d" have silicon on the collector).

Comparing FIG. 7 to FIG. 6, it can be observed that the tin-silicon sputtered anode (tin for 30 minutes (0.321 µm), then silicon for 2 hours (0.765 µm)) shows much improved cycling stability compared to the silicon-only anode. The tin-silicon dual-layered anode shows 0.956 mAh total charging capacity at the 40th cycle, which corresponds to 2926 mAh/g of silicon specific capacity, assuming that the tin layer reaches maximum capacity each cycle. The silicon-tin configuration anode with the silicon layer in between the current collector and a tin layer, reaches 0.607 mAh total charging capacity at the 58th cycle, which corresponds to 1453 mAh/g silicon specific capacity. The thin layer of tin (≈0.32 µm thickness, by calculation with mass and density) which is located between the silicon layer (≈0.76 µm) and stainless-steel current collector is expected to act as a conformal mixed conductive layer which improves and retains the interface between silicon and the substrate during cycling.

Figure 8:
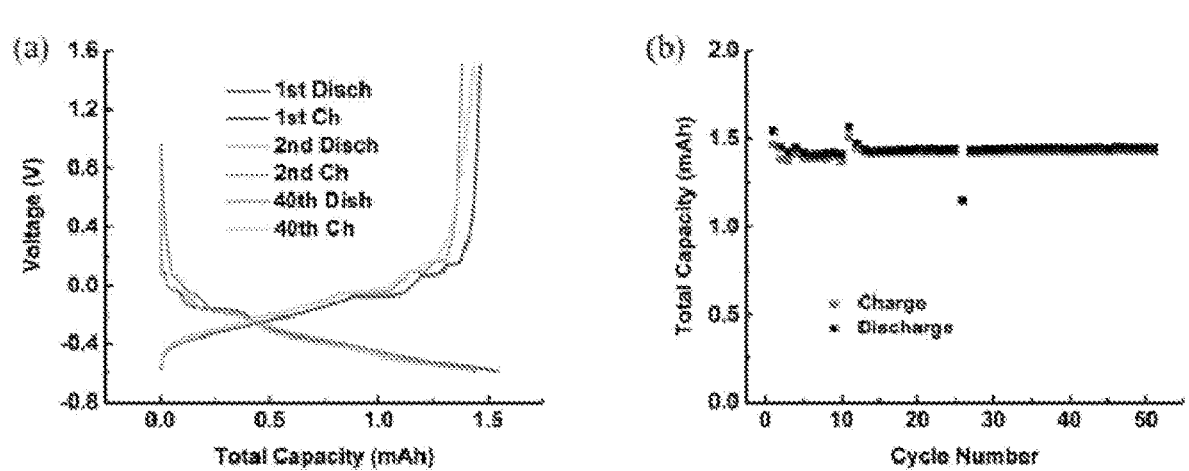
FIG. 8 is a set of plots indicating voltage and cycling characteristics of a solid-state electrochemical cell using an anode composition including multiple tin layers bounding a silicon layer, in accordance with FIG. 1C and an embodiment.

Further higher cycling stability may be achieved with a tin-silicon-tin trilayer anode structure as shown in FIG. 1C. The voltage and cycling characteristics of a solid-state electrochemical cell including this structure is shown in FIG. 8. This anode structure performs with excellent cycling stability, maintaining 1.44 mAh total charging capacity at the 51st cycle, which corresponds to 3860 mAh/g silicon specific capacity. Compared to the tin-silicon bilayer anode (FIG. 7 and FIG. 1B), the trilayer anode shows less irreversible capacity loss in the first cycle. This effect is attributed to the tin layer in contact with the electrolyte layer which is expected to prevent loss of contact due to silicon pulverization which happens during the first lithiation cycle. For the actual experimental cells, tin was sputtered for 30 minutes, followed by silicon for 2 hours and again followed by tin for 30 minutes.

Features described above as well as those claimed below may be combined in various ways without departing from the scope hereof. The following examples illustrate some possible, non-limiting combinations. It should thus be noted that the matter contained in the above description or shown in the accompanying drawings should be interpreted as illustrative and not in a limiting sense. The above-described embodiments should be considered as examples of the present invention, rather than as limiting the scope of the various inventions. In addition to the foregoing embodiments of inventions, review of the detailed description and accompanying drawings will show that there are other embodiments of such inventions. Accordingly, many combinations, permutations, variations and modifications of the foregoing embodiments of inventions not set forth explicitly herein will nevertheless fall within the scope of such inventions. The following claims are intended to cover generic and specific features described herein, as well as all statements of the scope of the present method and system, which, as a matter of language, might be said to fall there between.

We claim:

1. A solid-state battery comprising:
   a cathode;

an anode, the anode comprising a first anode layer and a second anode layer; wherein:
the first anode layer comprises an active material comprising a non-silicon metal capable of alloying with lithium or a non-silicon metalloid capable of alloying with lithium,
the second anode layer comprising silicon metal;
wherein one or both of the first anode layer or the second anode layer comprises a solid electrolyte material; and
a separator layer positioned between the anode and the cathode, the separator layer comprising a solid electrolyte material, wherein the second anode layer is positioned between the first anode layer and the separator,
wherein the first anode layer or the second anode layer comprises greater than 0 volume percent and less than 30 volume percent of the solid electrolyte material,
wherein when the first anode layer and the second anode layer both comprise a solid electrolyte material, the solid electrolyte material in the first anode layer is the same as the solid electrolyte material in the second anode layer or is different from the solid electrolyte material in the second anode layer.

2. The solid-state battery of claim 1, the anode further comprising a third anode layer adjacent to the second anode layer and opposite the first anode layer, the third anode layer comprising a non-silicon metal or metalloid capable of alloying with lithium.

3. The solid-state battery of claim 1, wherein the non-silicon metal capable of alloying with lithium or non-silicon metalloid capable of alloying with lithium has a hardness greater than 1 and less than 3 on the Mohs hardness scale.

4. The solid-state battery of claim 1, the non-silicon metalloid capable of alloying with lithium comprising tin.

5. The solid-state battery of claim 1, wherein when the first anode layer comprises greater than 0 volume percent and less than 30 volume percent of the solid electrolyte material, and the second anode layer contains no solid electrolyte material.

6. The solid-state battery of claim 1, wherein the first anode layer comprises a continuous sheet as fabricated.

7. The solid-state battery of claim 1, wherein the second anode layer comprises a continuous sheet as fabricated.

8. The solid-state battery of claim 1, wherein the first anode layer or the second anode layer comprises 5-30 volume percent of the solid electrolyte material.

9. The solid-state battery of claim 1, wherein the second anode layer comprises greater than 0 volume percent and less than 30 volume percent of the solid electrolyte material and the first anode layer contains no solid electrolyte material.

10. A solid-state battery comprising:
a cathode;
an anode, the anode comprising a first anode layer and a second anode layer; wherein:
the first anode layer comprises an active material comprising a non-silicon metal capable of alloying with lithium or a non-silicon metalloid capable of alloying with lithium,
the second anode layer comprising silicon metal;
wherein one or both of the first anode layer the second anode layer comprises a solid electrolyte material; and
a separator layer positioned between the anode and the cathode, the separator layer comprising a solid electrolyte material, wherein the second anode layer is positioned between the first anode layer and the separator,
wherein the first anode layer or the second anode layer comprises 5-30 volume percent of the solid electrolyte material,
wherein when the first anode layer and the second anode layer both comprise a solid electrolyte material, the solid electrolyte material in the first anode layer is the same as the solid electrolyte material in the second anode layer or is different from the solid electrolyte material in the second anode layer.

11. The solid-state battery of claim 10, wherein the non-silicon metal capable of alloying with lithium or non-silicon metalloid capable of alloying with lithium has a hardness greater than 1 and less than 3 on the Mohs hardness scale.

12. The solid-state battery of claim 10, the non-silicon metalloid capable of alloying with lithium comprising tin.

13. The solid-state battery of claim 10, wherein the second anode layer comprises 5-30 volume percent of the solid electrolyte material and the first anode layer contains no solid electrolyte material.

14. The solid-state battery of claim 10, wherein when the first anode layer comprises 5-30 volume percent of the solid electrolyte material and the second anode layer contains no solid electrolyte material.

* * * * *